United States Patent
Yoshioka et al.

(10) Patent No.: US 9,458,292 B2
(45) Date of Patent: Oct. 4, 2016

(54) METHOD FOR PURIFYING POLYETHYLENE GLYCOL HAVING ONE AMINO GROUP

(71) Applicant: NOF CORPORATION, Shibuya-ku, Tokyo (JP)

(72) Inventors: Hiroki Yoshioka, Kawasaki (JP); Shingo Kimura, Kawasaki (JP); Midori Hirai, Kawasaki (JP)

(73) Assignee: NOF CORPORATION, Tokyo (JP)

( * ) Notice: Subject to any disclaimer, the term of this patent is extended or adjusted under 35 U.S.C. 154(b) by 0 days.

(21) Appl. No.: 14/780,310

(22) PCT Filed: Mar. 24, 2014

(86) PCT No.: PCT/JP2014/058139
§ 371 (c)(1),
(2) Date: Sep. 25, 2015

(87) PCT Pub. No.: WO2014/157117
PCT Pub. Date: Oct. 2, 2014

(65) Prior Publication Data
US 2016/0046762 A1    Feb. 18, 2016

(30) Foreign Application Priority Data

Mar. 27, 2013 (JP) ................................. 2013-066687

(51) Int. Cl.
C08G 65/34 (2006.01)
C08G 65/30 (2006.01)
C08G 65/333 (2006.01)

(52) U.S. Cl.
CPC ............... *C08G 65/34* (2013.01); *C08G 65/30* (2013.01); *C08G 65/333* (2013.01)

(58) Field of Classification Search
CPC ..... C08G 65/30; C08G 65/34; C08G 65/333
See application file for complete search history.

(56) References Cited

U.S. PATENT DOCUMENTS

| 5,643,575 A | 7/1997 | Martinez et al. |
| 2008/0004345 A1 | 1/2008 | Tabata et al. |
| 2008/0033128 A1 | 2/2008 | Kawamura |
| 2008/0264254 A1 * | 10/2008 | Song ...................... B01D 53/02 95/116 |
| 2009/0000834 A1 | 1/2009 | Carletti et al. |

FOREIGN PATENT DOCUMENTS

| JP | 8-165343 A | 6/1996 |
| JP | 9-504299 A | 4/1997 |
| JP | 9-169683 A | 6/1997 |
| JP | 2004-197077 A | 7/2004 |
| JP | 2010-254978 A | 11/2010 |
| JP | 2010-254981 A | 11/2010 |
| WO | 2005095494 A1 | 10/2005 |
| WO | 2006006511 A1 | 1/2006 |
| WO | 2006/057778 A2 | 6/2006 |
| WO | WO 2011-057584 * | 3/2011 |

OTHER PUBLICATIONS

Search Report dated Jun. 17, 2014 issued by the International Searching Authority in International Application No. PCT/JP2014/058139.
Written Opinion dated Jun. 17, 2014 issued by the International Searching Authority in International Application No. PCT/JP2014/058139.

* cited by examiner

*Primary Examiner* — Shailendra Kumar
(74) *Attorney, Agent, or Firm* — Sughrue Mion, PLLC

(57) ABSTRACT

A method for purifying a polyethylene glycol compound having one amino group, which includes (A) preparing an aqueous solution of the compound having a pH of 1 to 5, (B) an extracting step of mixing the aqueous solution with a mixed organic solvent to cause layer separation into organic and aqueous layers, wherein a ratio of an organic solvent I is 25 to 65% by mass and a ratio of an organic solvent II is 75 to 35% by mass, the organic solvent I is selected from an aromatic hydrocarbon and an ester, the organic solvent II is a halogenated hydrocarbon, and a mixing ratio Y of I to II, temperature T (° C.) at mixing, and molecular weight M of the compound satisfy the following relationship:

$$1.9 \times 10^{-6}M + 0.09 \leq Y - 0.015T \leq -1.4 \times 10^{-6}M + 0.44$$

and (C) recovering the compound from the aqueous layer.

16 Claims, 5 Drawing Sheets

RELATIONSHIP BETWEEN MIXING RATIO Y
AND EXTRACTION TEMPERATURE T
(RANGE WHERE PURIFICATION IS POSSIBLE)

$Y2 = 0.015T + B$    $(B = -1.4 \times 10^{-6}M + 0.44)$ $Y1 = 0.015T + C$    $(C = 1.0 \times 10^{-6}M + 0.19)$ $Y3 = 0.015T + A$    $(A = 1.9 \times 10^{-6}M + 0.09)$

METHOD FOR PURIFYING POLYETHYLENE GLYCOL HAVING ONE AMINO GROUP

This application is a 371 of PCT/JP2014/058139, filed Mar. 24, 2014.

TECHNICAL FIELD

The present invention relates to a method for purifying a polyethylene glycol compound having one amino group, the compound being used in pharmaceutical uses. More specifically, the invention is a purification method for obtaining a highly pure polyethylene glycol compound having one amino group that is a high-molecular-weight activated polyethylene glycol for chemical modification uses in drug delivery systems and is used as a raw material thereof.

The invention is particularly suitable in pharmaceutical uses including modification of polypeptides, enzymes, antibodies, and other low-molecular drugs, nucleic acid compounds including genes, oligonucleic acids, and the like, nucleic acid medicaments, and other physiologically active substances or application to drug delivery system carriers such as liposomes, polymer micelles, and nanoparticles.

BACKGROUND ART

Recently, activated polyethylene glycols have been widely used as important carriers for drug delivery systems. As such activated polyethylene glycols for the purpose of the pharmaceutical uses, those containing little impurities have been required from the viewpoints of performance and safety of drugs to be produced by modifying them. A polyethylene glycol having an amino group is itself a modifier of drugs and also is a raw material for synthesizing other activated polyethylene glycols. When a polyethylene glycol having no amino group is contained as an impurity in a polyethylene glycol having one amino group, in the case where an activated polyethylene glycol is synthesized using it as a raw material, a highly pure activated polyethylene glycol having one amino group cannot be synthesized. Therefore, a modification ratio decreases when the product is bound to a drug, and there is a possibility that expected effects cannot be obtained. Since the polyethylene glycol compound having no amino group that is an impurity and the polyethylene glycol having one amino group are high-molecular-weight compounds, physicochemical properties are resemble, so that separation from each other is difficult by a common technique.

On the other hand, the purification of the drug after bonding to the polyethylene glycol also has a technical problem that separation thereof is difficult. In the case where the purification is carried out, a drug yield is remarkably decreased and hence a production cost increases. Accordingly, it is desirable to remove the polyethylene glycol compound that is an impurity as far as possible prior to the bonding to the drug.

In general, in the case where impurities such as low-molecular compounds and salts are removed from macromolecular compounds, a crystallization operation and an extraction operation are frequently performed. In the case where the impurity to be removed is a low molecule, physicochemical properties remarkably vary depending on large difference in molecular weight and particularly, since a large difference in solubility takes place, separation and purification become possible. On the other hand, in the case where the molecular weight of the impurity is large, not so large difference in physicochemical properties such as solubility does not appear. Therefore, it is difficult to separate and remove the polyethylene glycol compound having no amino group from the polyethylene glycol compound having one amino group by a common operation for removing a low-molecular impurity.

On the other hand, with regard to a low-molecular-weight compound having an amino group, when it is protonated at low pH, hydrophilicity increases owing to ionic interaction. Therefore, in the case where the hydrophilicity of an impurity is low, it is possible to extract the impurity into an organic layer to remove it by an extraction operation using a suitable organic solvent. However, since a polyethylene glycol compound itself has high hydrophilicity, it is difficult to separate the polyethylene glycol compound having one amino group and the polyethylene glycol compound having no amino group that is an impurity by extraction with an aqueous layer and a single hydrophobic organic layer. On the other hand, when an organic solvent such as a halogenated hydrocarbon that is a good solvent for a polyethylene glycol compound is used, the polyethylene glycol compound is extracted into an organic layer irrespective of the existence of an amino group, so that separation and purification is also impossible.

Here, the characteristic features of conventional techniques are described and also it is describe whether the purification of the polyethylene glycol compound having one amino group is possible by the techniques and whether the techniques can be carried out in an industrial scale.

As one method, as shown in Patent Document 1 (JP-A-8-165343), in the case of a polyethylene glycol having an amine, it is possible to separate it by a chromatogram using an ion-exchange resin. However, since such a purification method using an ion-exchange resin is a method of principally utilizing interaction and adsorption phenomenon to a solid surface, it is necessary to perform a purification treatment using a large amount of the resin under a dilute solution condition. Since the step has to be performed under such dilution that the concentration of the polyethylene glycol compound in the step is about 1 to 2% in order to suppress a decrease in separation ability, so that the method is not sufficiently satisfactory from the viewpoint of industrial productivity. Moreover, finally, a waste of a large amount of the ion-exchange resin is discharged and thus this method is also a purification method having a problem on industrial utilization.

On the other hand, as shown in Patent Document 2 (JP-A-2010-254978), there is a method in which a polyethylene glycol compound that is an impurity is physically adsorbed on a adsorbent and removed. When a suitable adsorbent is used, a polyethylene glycol impurity having two hydroxyl groups that is an impurity is preferentially adsorbed but there is no description that an impurity can be selectively removed depending on the presence or absence of an amino group. Furthermore, in the case of performing the method in an industrial scale, there is a problem that a large amount of the adsorbent filtrated off after the adsorption treatment becomes waste.

On the other hand, there is a method in which a high-molecular-weight polyethylene glycol is mixed with an organic solvent in water to fractionate and remove an impurity having different molecular weight, as shown in Patent Document 3 (JP-A-2010-254981). It becomes possible to remove the impurity having different molecular weight by controlling salt concentration of the aqueous solution and extraction temperature. Since the method is a simple method, it is possible to carry out the method in an industrial scale and there is a large advantage that waste such as an adsorbent is not discharged. However, by this method, polyethylene glycol compounds having the same molecular weight cannot be separated from each other depending on the presence or absence of an amino group.

On the other hand, as shown in Patent Document 4 (US2009/000834), there is a method of separating a low-molecular compound having two tertiary amines from a low-molecular compound having one tertiary amine in the structure. An aqueous solution of low-molecular compounds having tertiary amine(s) are adjusted to pH 4 with an acid to protonate the amine group. When ethyl acetate is mixed thereto to cause layer separation, the objective low-molecular compound having one tertiary amine can be selectively extracted into the ethyl acetate layer. Moreover, as shown in Patent Document 5 (WO2006/057778), there is a method of separating Methamphetamine that is a secondary amine from Benzphetamine that is a tertiary amine. A roughly purified product of Benzphetamine is dissolved in water and the solution is adjusted to pH 6 with an acid to protonate the amino group. When toluene is mixed thereto to cause layer separation, the objective Benzphetamine can be selectively extracted into the toluene layer. In both methods, the separation of the objective substance from the impurity is made possible by adjusting the aqueous solution to suitable pH by adding an acid. These methods include relatively simple steps and discharge little waste and hence the methods are sufficiently applicable even in an industrial scale. However, since a polyethylene glycol compound has high hydrophilicity, the compound cannot be extracted into an organic layer with such ethyl acetate or toluene as used in the above system, irrespective of the presence or absence of the amino group. On the other hand, in the case where an organic solvent such as a halogenated hydrocarbon-based one is used, even when pH is lowered to protonate the amino group and thus the hydrophilicity is enhanced, the polyethylene glycol compound having one amino group and the polyethylene glycol compound having no amino group are both extracted into the organic layer, so that selectivity is not realized. Accordingly, extraction purification cannot be achieved by applying these methods.

The polyethylene glycol compounds having one amino group for use in pharmaceutical uses all contain polyethylene glycol impurities formed during the production process. These impurities are polyethylene glycol compounds having about the same molecular weight as that of the objective substance and hence removal thereof includes many problems.

PRIOR ART DOCUMENTS

Patent Documents

Patent Document 1: JP-A-8-165343
Patent Document 2: JP-A-2010-254978
Patent Document 3: JP-A-2010-254981
Patent Document 4: US2009/000834
Patent Document 5: WO2006/057778
Patent Document 6: JP-A-2004-197077
Patent Document 7: JP-T-9-504299 (the term "JP-T" as used herein means a published Japanese translation of a PCT patent application)

SUMMARY OF THE INVENTION

Problems that the Invention is to Solve

An object of the present invention is to provide an industrially practicable purification method which is capable of purifying a polyethylene glycol compound having one amino group with good efficiency and purity and does not discharge any waste such as any adsorbent and any ion-exchange resin.

Means for Solving the Problems

As a result of extensive studies for solving the above problems, the present inventors have found a method for purifying a polyethylene glycol compound having one amino group by performing an extraction operation in a specific temperature range in a system composed of two or more kinds of organic solvents that are mixed in a certain ratio and an acidic aqueous solution. The invention is characterized in that it can be realized by controlling a mixing ratio of a specific aromatic hydrocarbon solvent or ester compound solvent and a halogenated hydrocarbon-based solvent and extraction temperature to suitable ranges and the method is practicable even in a large scale without using a large amount of support/adsorbent such as a resin or gel, an ultrafiltration membrane, and the like and hene is industrially applicable.

Namely, the invention is as follows.
(1) A method for purifying a polyethylene glycol compound having one amino group and having a total average molar number of ethylene oxide units added in the molecule thereof of 20 to 2300,
the method comprising the following steps (A), (B) and (C):
(A) a step of preparing an aqueous solution of the polyethylene glycol compound having one amino group, the solution having a pH of 1 to 5,
(B) an extraction step of mixing the aqueous solution obtained in the step (A) with a mixed organic solvent at a temperature of 10° C. or higher and 55° C. or lower and causing layer separation into an organic layer and an aqueous layer, wherein a ratio of an organic solvent I is 25 to 65% by mass and a ratio of an organic solvent II is 75 to 35% by mass in the mixed organic solvent, the organic solvent I is selected from an aromatic hydrocarbon-based solvent having a total carbon number of 8 or less and an ester compound solvent containing no hetero atom and having a total carbon number of 5 or less, the organic solvent II is a halogenated hydrocarbon-based solvent, and a mixing ratio Y of the organic solvent I to the organic solvent II (organic solvent I/organic solvent II), temperature T (° C.) at the mixing, and molecular weight M of the polyethylene glycol compound satisfy the following relationship:

$$1.9\times10^{-6}M+0.09 \leq Y-0.015T \leq -1.4\times10^{-6}M+0.44$$

(C) a step of recovering the polyethylene glycol compound from the aqueous layer.
(2) In the step (B), the mixing ratio Y of the organic solvent I to the organic solvent II (organic solvent I/organic solvent II), the temperature T (° C.) at the mixing, and the molecular weight M of the polyethylene glycol compound satisfy the following relationship:

$$1.0\times10^{-6}M+0.19 \leq Y-0.015T \leq -1.4\times10^{-6}M+0.44$$

(3) The method according to (1) or (2), wherein the extraction step (B) is repeated one or more times for the aqueous layer separated in the step (B).
(4) The method according to any one of (1) to (3), wherein the aqueous solution contains an acidic reagent selected from the group consisting of hydrochloric acid, phosphoric acid, and trifluoroacetic acid, in the step (A).

(5) The method according to any one of (1) to (4), wherein the organic solvent I is selected from the group consisting of toluene and ethyl acetate.
(6) The method according to any one of (1) to (5), wherein the organic solvent II is chloroform.
(7) The method according to any one of (1) to (6), wherein a mass of the organic solvent I and a mass of the organic solvent II in the step (B) are each 1 to 50 times a mass of the polyethylene glycol compound and a mass of the water contained in the aqueous solution in the step (A) is 1 to 50 times the mass of the polyethylene glycol compound.
(8) The method according to any one of (1) to (7), wherein after the aqueous layer is made neutral or alkaline, the polyethylene glycol is recovered by concentration, crystallization or drying via extraction into an organic layer, in the step (C).
(9) The method according to any one of (1) to (8), wherein the total average molar number of ethylene oxide units added in the polyethylene glycol compound molecule is 40 to 2050.

Advantage of the Invention

The present invention relates to a novel purification method for obtaining a highly pure polyethylene glycol compound having one amino group for the purpose of pharmaceutical uses. In this purification method, it is possible to separate a polyethylene glycol having no amino group from an objective substance utilizing solubility intrinsic to polyethylene glycol. Furthermore, it is also possible to separate a polyethylene glycol having about the same molecular weight as that of the objective substance and having no amino group, the polyethylene glycol being difficult to separate by conventional techniques. Moreover, the method is industrially easily practicable, is excellent in productivity, and can be carried out in high yields with steps in which waste such as an adsorbent or an ion-exchange resin is not formed.

MODES FOR CARRYING OUT THE INVENTION

Figure 1:
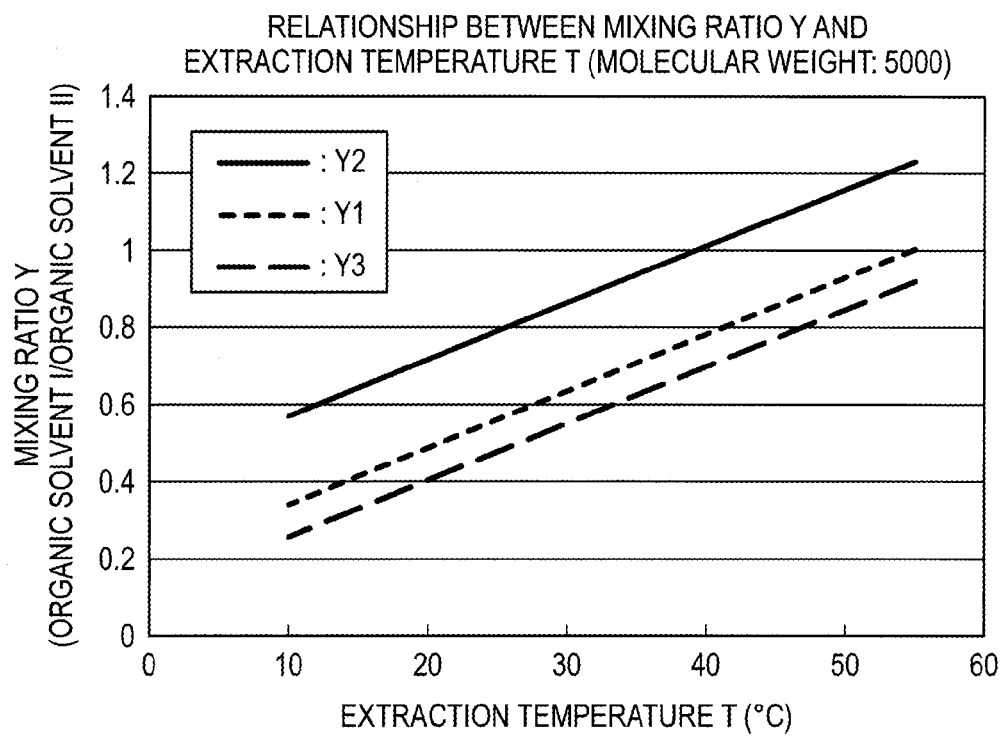
FIG. 1 is a graph showing a relationship between a solvent mixing ratio Y and extraction temperature T in the case where the molecular weight of polyethylene glycol is 5000.

The polyethylene glycol compound having one amino group of the invention means a compound which has, in the polyethylene glycol molecule, one amino group capable of being reacted with another molecule.

The total average molar number of ethylene oxide units added in the molecule of the polyethylene glycol compound having one amino group of the invention is 20 or more, preferably 40 or more, and more preferably 110 or more. Moreover, the total average molar number of ethylene oxide units added in the molecule of the present polyethylene glycol compound is 2300 or less, preferably 2050 or less, more preferably 1850 or less, and further preferably 1350 or less.

The molecular weight of the polyethylene glycol compound having one amino group of the invention is 1000 or more, preferably 2000 or more, and more preferably 5000 or more. Moreover, the molecular weight of the polyethylene glycol compound is 106060 or less, preferably 104167 or less, and more preferably 90000 or less, but is further preferably 80000 or less and most preferably 60000 or less.

The high-molecular-weight polyethylene glycol compound having one amino group of the invention has a linear or branched structure. The branched one is preferably a glycerin backbone, a pentaerythritol backbone, or a xylitol backbone and is more preferably a glycerin backbone. These compounds are obtained, for example, through a step of polymerizing ethylene oxide and a subsequent activation step from a monohydric or polyhydric starting material having hydroxyl group(s) as described in Patent Document 6 (JP-A-2004-197077) or are obtained typically through a coupling reaction of two or more linear polyethylene glycols and an activation step as described in Patent Document 7 (JP-T-9-504299).

The polyethylene glycol compound that can be purified in the invention is one having only one amino group in the structure. The amino group is not limited to the amino group bound to a carbon atom and includes an oxyamino group in which it is bound to an oxygen atom, a hydrazino group in which it is bound to a nitrogen atom, and the like. The functional group bound to the end of the polyethylene glycol chain other than the amino group is a hydrocarbon group having 1 to 7 carbon atoms, a functional group not to be ionized with an acid, or a protecting group of a functional group. As the hydrocarbon group having 1 to 7 carbon atoms, there may be mentioned alkyl groups such as a methyl group, an ethyl group, a propyl group, an isopropyl group, a butyl group, an isobutyl group, a sec-butyl group, a tert-butyl, a pentyl group, an isopentyl group, a hexyl group, an isohexyl group, a heptyl group, and an isoheptyl group, a phenyl group, a benzyl group, and the like. The hydrocarbon group is preferably a methyl group, an ethyl group, a tert-butyl, and a benzyl group, and more preferably a methyl group. The functional group not to be ionized with an acid is preferably a carboxylic group, a hydroxyl group, a thiol group, an acetyl group, or an azido group, and more preferably a hydroxy group. The protecting group of the functional group is preferably a protecting group of an amino group, a carboxyl group, a hydroxyl group, a thiol group, a hydrazine group, a hydrazide group, or an oxyamine group, and more preferably a protecting group of a hydroxyl group.

(Step (A))

As the acidic aqueous solution to be used in the invention, an aqueous solution of an inorganic acid or an organic acid is used. Here, the inorganic acid and the organic acid are not particularly limited, but in general, there may be mentioned hydrochloric acid, hydrobromic acid, hydroiodic acid, phosphoric acid, sulfuric acid, nitric acid, trifluoroacetic acid, methanesulfonic acid, citric acid, and the like. Preferably, the acid is hydrochloric acid, phosphoric acid, or trifluoroacetic acid, and more preferably phosphoric acid.

The pH of the acidic aqueous solution is controlled to 1 to 5, more preferably 1 to 3, since the protonation of the amino group is insufficient and thus the hydrophilicity cannot be increased when the pH is high and the decomposition of the polyethylene glycol compound occurs when the pH is too low.

(Step (B))

This step is a step of mixing an organic solvent with the acidic aqueous solution containing the polyethylene glycol compound having one amino group dissolved therein by stirring or shaking and causing layer separation into an organic layer and an aqueous layer by allowing the mixture to stand for a certain period of time. In the extraction step, the high-molecular-weight polyethylene glycol compound having one amino group is preferably dissolved in the acidic solution beforehand, since there is a high possibility that the separation of impurities and recovery of the objective substance becomes impossible due to emulsification when the compound is mixed with the acidic solution in a state that it is dissolved in the organic solvent beforehand.

The time for mixing and layer separation during the step is not particularly limited but is preferably between 1 minute to 12 hours, and more preferably from 10 minutes to 3 hours. Also, the atmosphere for carrying out the extraction operation is not particularly limited, but the operation is preferably carried out in the presence of a gas such as nitrogen that is inert, for the purpose of minimizing oxidation. Furthermore, an apparatus is also not particularly limited but, in consideration of the operation under nitrogen and in a sealed state for less occurrence of oxidative degradation, the operation can be also carried out in a pressure vessel.

The organic solvent I to be used in the extraction operation of the invention is an aromatic hydrocarbon-based solvent having a total carbon number of 8 or less and/or an ester compound solvent having a total carbon number of 5 or less, and is preferably xylene, toluene, benzene, methyl acetate, ethyl acetate, or butyl acetate, more preferably toluene or ethyl acetate, and most preferably toluene.

The organic solvent II to be used in the extraction operation of the invention is a halogenated hydrocarbon-based solvent, and is preferably methylene chloride, chloroform, or carbon tetrachloride, more preferably, methylene chloride or chloroform, and most preferably chloroform.

A common polyethylene glycol compound to be used in the invention shows characteristic solubility and the solubility is as follows: organic solvent II>Water>organic solvent I. On the other hand, a polyethylene glycol compound having a protonated amino group has hydrophilicity higher than that of a polyethylene glycol compound having no amino group. Therefore, when an organic solvent in which an appropriate amount of the organic solvent II is mixed with the organic solvent I is used, the solubility of the polyethylene glycol compound having an amino group becomes as follows: water>(organic solvent I+organic solvent II) and the solubility of the polyethylene glycol compound having no amino group becomes as follows: (organic solvent I+organic solvent II)>water. Namely, since the polyethylene glycol compound having an amino group is distributed into an aqueous layer and the polyethylene glycol compound having no amino group is distributed into an organic layer, separation and purification can be selectively carried out.

The organic solvent to be used in the extraction operation in the invention is a mixed solution having a mixing ratio of the organic solvent I: 25 to 65% by mass and the organic solvent II: 75 to 35% by mass. Since the specific gravity of the organic solvent I is smaller than 1 and the specific gravity of the organic solvent II is larger than 1, when the ratio of the organic solvent I increases, the specific gravity of the mixed solvent approaches to the specific gravity of the aqueous solution and hence layer separation ability tends to get worse. Therefore, the mixed solution is preferably a mixed solution having a mixing ratio of the organic solvent I: 25 to 50% by mass and the organic solvent II: 75 to 50% by mass.

As shown in the following Examples, when the mixing ratio of the organic solvent I to the organic solvent II (organic solvent I/organic solvent II) is taken as Y, the temperature in the step (B) is taken as T (° C.), and the molecular weight of the polyethylene glycol compound is taken as M, purification is possible in the range where the following relationship is satisfied. Thereby, the present inventors have first succeeded in providing a purification method capable of industrial separation of the highly pure aforementioned polyethylene glycol compound.

$$1.9 \times 10^{-6} M + 0.09 \leq Y - 0.015 T \leq -1.4 \times 10^{-6} M + 0.44$$

The mass of the organic solvent I and the mass of the organic solvent II are preferably each 1 to 50 times the mass of the polyethylene glycol compound and the mass of water is preferably 1 to 50 times the mass of the polyethylene glycol compound. More preferably, the mass of the organic solvent I and the mass of the organic solvent II are preferably each 2 to 20 times the mass of the polyethylene glycol compound and the mass of water is preferably 2 to 20 times the mass of the polyethylene glycol compound. Particularly preferably, the mass of the organic solvent I and the mass of the organic solvent II are preferably each 5 to 20 times the mass of the polyethylene glycol compound and the mass of water is preferably 5 to 20 times the mass of the polyethylene glycol compound.

The temperature at which the extraction operation is carried out is controlled to 55° C. or lower since the amount of polyethylene glycol that migrates to the organic solvent increases when the temperature becomes high, and the temperature is more preferably 45° C. or lower, and further preferably 35° C. or lower. Moreover, the temperature at which the extraction operation is carried out is controlled to 10° C. or higher, and is more preferably 15° C. or higher, and further preferably 20° C. or higher.

(Step (C))

The recovery step (C) after the extraction step in the invention comprises a method for recovering the polyethylene glycol compound having one amino group from the aqueous layer.

The acidic aqueous solution containing the polyethylene glycol compound having one amino group is made neutral or alkaline with a base. Thereafter, through the extraction into the organic layer, the polyethylene glycol compound having one amino group is recovered by a step including any of concentration, crystallization, drying, and the like.

EXAMPLES

The following will describe the invention further in detail with reference to Examples.

The polyethylene glycol impurities having no amino group to be separated and removed in Examples are impurities having about the same molecular weight as that of the polyethylene glycol compound having one amino group. Incidentally, for the analysis of the polyethylene glycol compounds, GPC and HPLC are used. The amine yield described in Examples means (Mass (g) after purification×

Amine purity (%) after purification)÷(Mass (g) of raw material×Amine purity (%) of raw material)×100.

The molecular weight of the raw material was measured under the following conditions using LC-10Avp (Shimadzu) as a GPC system.
GPC apparatus: LC-10Avp (Shimadzu)
Developing liquid: DMF (10 mM LiBr)
Flow rate: 0.7 mL/min
Column: PL gel MIXED-D (Polymer Laboratory)
Column temperature: 65° C.
Detector: RI
Sample concentration (injection quantity): 30 mg/30 mL (100 μL)

A calibration curve was made as a standard substance of the polyethylene glycol compound.
<Analytical Method for HPLC>
[Case of Amino Group]

A measurement sample was prepared by dissolving 50 mg of a polyethylene glycol compound having an amino group into 10 g of a sodium phosphate buffer solution that is an eluent to be used in HPLC measurement. The HPLC measurement was performed under the following conditions.
HPLC apparatus: alliance (Waters)
Column: cation-exchange column TSK-gel SP-5PW (Tosoh)
Flow rate: 0.5 mL/minute
Analysis time: 20 minutes
Column temperature: 40° C.
Injection quantity: 20 μL
Detector: RI
Mobile phase: sodium phosphate buffer solution (pH 6.5)
[Case of Oxyamino Group]

Into 2 mL of a 0.1M acetate buffer solution (pH 4.0) was dissolved 20 mg of a polyethylene glycol compound having an oxyamino group. Then, 68 μL of a methanol solution of terephthalaldehyde (45 mg/mL) and further 128 μL of an aqueous sodium cyanoborohydride solution (10 mg/mL) were added thereto and dissolved, followed by stirring and reaction at 75° C. for 3 hours. The whole amount of the reaction solution was added to a gel permeation column (PD-10 (Amersham Bioscience)) equilibrated with an ammonium formate buffer solution (pH 8.0) that is an eluent to be used in HPLC measurement, the eluent was further added, and a high-molecular-weight substance fraction first eluted was collected in a vial for HPLC measurement. The HPLC measurement was performed under the following conditions.
HPLC apparatus: alliance (Waters)
Column: anion-exchange column ES-502N (Asahipak)
Flow rate: 1.0 mL/minute
Analysis time: 20 minutes
Column temperature: 30° C.
Injection quantity: 20 μL
Detector: RI
Mobile phase: ammonium formate buffer solution (pH 8.0)

As for polyethylene glycol compounds having various molecular weights, effects of the purification by extraction were investigated. As representatives, explanation is performed in the following with reference to data for molecular weights of 5000 and 60000.

A polyethylene glycol compound was dissolved into water and an acid was added to adjust pH to 2. A mixed solution of the organic solvent I and the organic solvent II was added thereto and an extraction operation was performed at 15, 25, 35, or 55° C. The organic layer was distilled off under reduced pressure on an evaporator and mass measurement and HPLC measurement of the resulting concentrate were performed. Each mass was calculated from the ratio of peak areas of a polyethylene glycol compound having one amino group and a polyethylene glycol compound having no amino group in HPLC chromatograms.

A polyethylene glycol compound having one protonated amino group in the acidic aqueous solution mainly remains in the aqueous layer at extraction and impurities tends to migrate to the organic layer. However, purification cannot be achieved unless the extraction is carried out at suitable mixing ratio of solvents and extraction temperature.

Here, the mixing ratio Y of the organic solvent I to the organic solvent II, at which the mass of the polyethylene glycol compound having one amino group contained in a concentrate obtained by concentrating the organic layer becomes 20%, is taken as Y3. Y3 is an index of the mixing ratio regarding to a yield obtained by extraction. In the case where the mixing ratio Y of the solvents is smaller than Y3, the polyethylene glycol compound having one amino group is distributed and removed into the organic layer together with the polyethylene glycol compound having no amino group, so that the yield of the polyethylene glycol compound having one amino group decreases.

The yield in the case where the mixing ratio Y is Y3 is more specifically explained. When extraction is performed using 100 g of a polyethylene glycol compound having an amine purity of 90% and the organic layer is concentrated, 10 g of a concentrate is obtained, for example. The mass of the polyethylene glycol compound having one amino group corresponding to 20% of the concentrate is as follows: 10 g×20%÷100=2 g. A decrease in the yield is as follows: 2 g÷(100 g×90%÷100)×100=2.2%.

Next, the mixing ratio Y at which a concentrate starts to be obtained by the concentration of the organic layer is taken as Y2. Y2 is an index of the mixing ratio at which purification becomes possible by the extraction method of the invention. Namely, it is a point at which a polyethylene glycol compound having no amino group that is an impurity starts to be preferentially distributed into the organic layer. When the mixing ratio Y of the solvents is larger than Y2, the polyethylene glycol compound having no amino group cannot be distributed and removed into the organic layer, so that purification is impossible.

The relationship between Y3 and Y2 is always Y3<Y2.

Therefore, the mixing ratio Y of the solvents is between Y3 and Y2, it is meant that the aforementioned polyethylene glycol compound can be purified by extraction with industrially utilizable high efficiency.

Figure 2:
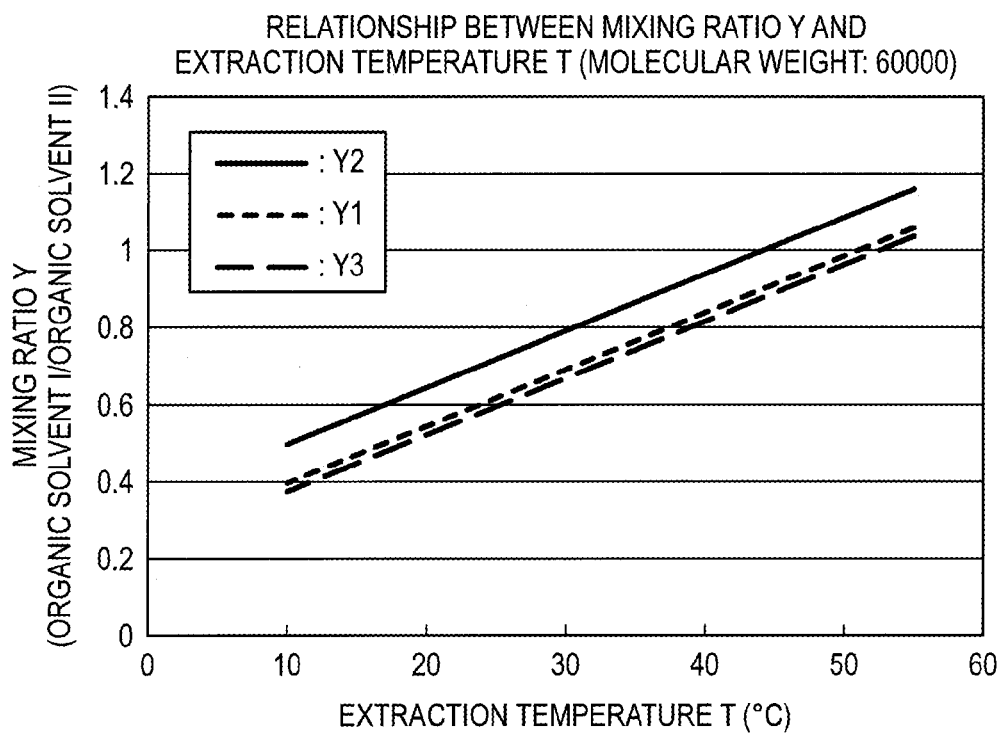
FIG. 2 is a graph showing a relationship between a solvent mixing ratio Y and extraction temperature T in the case where the molecular weight of polyethylene glycol is 60000.

As shown in FIGS. 1 and 2, representing the mixing ratio Y on the ordinate and the extraction temperature T (° C.) on the abscissa, the mixing ratio (Y3) at which the mass of the objective substance contained in the concentrate obtained by concentrating the organic layer is 20% and the mixing ratio (Y2) at which a concentrate starts to be obtained by the concentration of the organic layer were plotted.

As illustrated in FIGS. 1 and 2, Y3 and Y2 can be expressed as follows as functions of the temperature T.

In the case of molecular weight M=5000: Y3=0.015T+0.11, Y2=0.015T+0.43

In the case of molecular weight M=60000: Y3=0.015T+0.22, Y2=0.015T+0.35

As above, the slope of the graph, i.e., 0.015, to temperature change was independent to the molecular weight of the polyethylene glycol compound and was constant. In other words, Y3 and Y2 can be both represented by (0.015T+ intercept).

Therefore, representing the intercept of Y on the ordinate and the molecular weight M on the abscissa, the intercepts of Y3 and Y2 are plotted. As shown in the following FIG. 3, both are in a proportional relationship to the molecular weight M.

Figure 3:
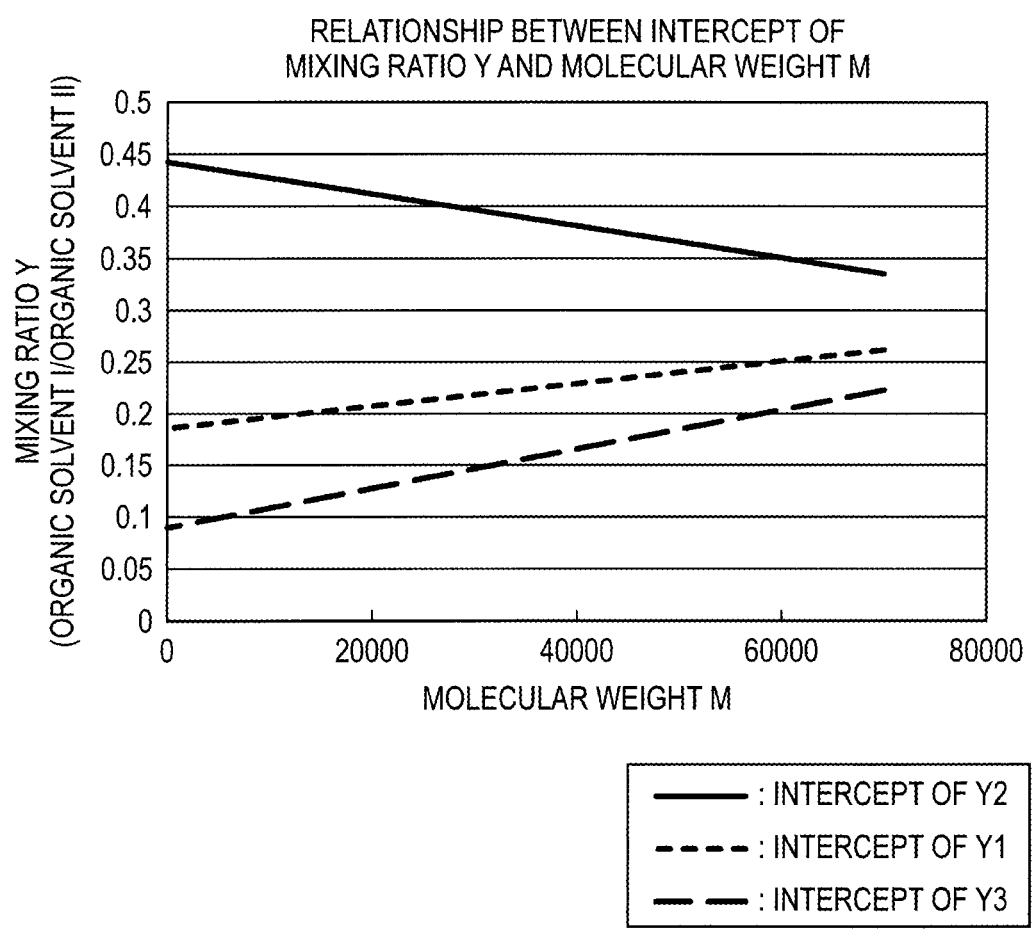
FIG. 3 is a graph showing a relationship between the molecular weight M of polyethylene glycol and an intercept of the solvent mixing ratio Y.

Namely, from FIG. 3, when Y3 and Y2 are regarded as functions of the molecular weight M, the following equations can be derived.

$$Y3=1.9\times10^{-6}M+0.015T+0.09$$

$$Y2=-1.4\times10^{-6}M+0.015T+0.44$$

On the other hand, when extraction purification is preformed using a polyethylene glycol compound having a certain molecular weight, the molecular weight M can be regarded as a constant, so that, when the temperature T is a variable and respective intercepts are taken as A and B for Y3 and Y2, the following equations are obtained: Y3=0.015T+A and Y2=0.015T+B. These relationships are shown as in FIG. 4.

Figure 4:
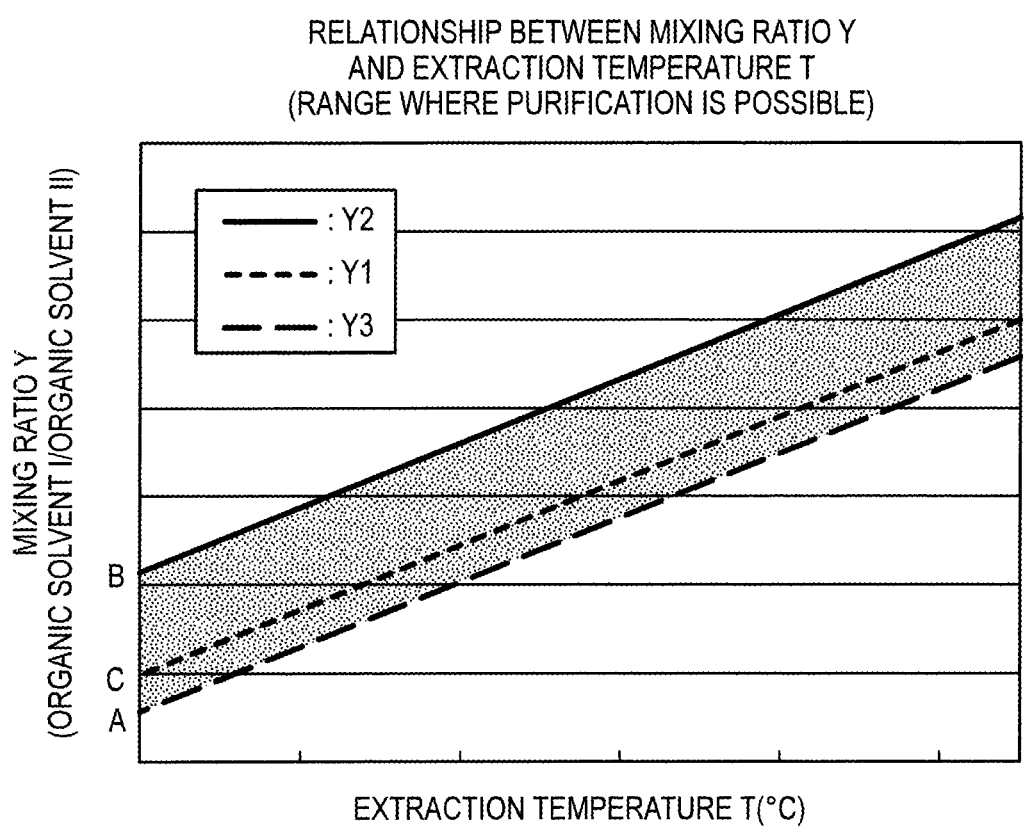
FIG. 4 is a graph showing a relationship between a solvent mixing ratio Y of polyethylene glycol and extraction temperature T and is a graph showing a range where a purification treatment is possible.

As shown in FIG. 4, the purification by extraction is possible when the mixing ratio Y falls within the gray area in FIG. 4, that is, falls within the region that satisfies Y≤0.015T+B and Y≥0.015T+A.

In summary, when the mixed ratio of the organic solvent I to the organic solvent II (organic solvent I/organic solvent II) is taken as Y, the temperature in the step (B) is taken as T (° C.), and the molecular weight of the polyethylene glycol compound is taken as M, the following:

$$1.9\times10^{-6}M+0.09\leq Y-0.015T\leq-1.4\times10^{-6}M+0.44$$

shows a range where purification is possible.

On the other hand, when the intercepts A and B coincide with each other, the region where extraction purification is possible in FIG. 4 is not present. The molecular weight M at this time is M=106060 due to the fact of A=B. That is, the upper limit of the molecular weight, at which the extraction purification is possible, comes to 106060.

Furthermore, a preferable condition is as follows.

The mixing ratio Y when the mass of the polyethylene glycol compound having one amino group contained in a concentrate obtained by concentrating the organic layer becomes 5% is taken as Y1.

The yield in the case where the mixing ratio Y is Y1 is more specifically explained. When extraction is performed using 100 g of a polyethylene glycol compound having an amine purity of 90% and the organic layer is concentrated, 10 g of a concentrate is obtained, for example. The mass of the polyethylene glycol compound having one amino group corresponding to 5% of the concentrate is as follows: 10 g×5%÷100=0.5 g. A decrease in the yield is as follows: 0.5 g/(100 g×90%÷100)×100=0.55%.

The mixing ratio Y at which a concentrate starts to be obtained during the concentration of the organic layer is taken as Y2.

The relationship between Y1 and Y2 is always Y1<Y2.

Therefore, the mixing ratio Y of the solvents is between Y1 and Y2, it is meant that the aforementioned polyethylene glycol compound can be purified by extraction with industrially utilizable high efficiency.

As shown in FIGS. 1 and 2, representing the mixing ratio Y on the ordinate and the extraction temperature T (° C.) on the abscissa, the mixing ratio (Y1) at which the mass of the objective substance contained in the concentrate obtained by concentrating the organic layer is 5% and the mixing ratio (Y2) at which a concentrate starts to be obtained by the concentration of the organic layer were plotted.

As illustrated in FIGS. 1 and 2, Y1 and Y2 can be expressed as follows as functions of the temperature T.

In the case of molecular weight M=5000: Y1=0.015T+0.19, Y2=0.015T+0.43

In the case of molecular weight M=60000: Y1=0.015T+0.25, Y2=0.015T+0.35

As above, the slope of the graph, i.e., 0.015 to temperature change was independent to the molecular weight of the polyethylene glycol compound and was constant. In other words, Y1 and Y2 can be both represented by (0.015T+intercept).

Therefore, representing the intercept of Y on the ordinate and the molecular weight M on the abscissa, the intercepts of Y1 and Y2 are plotted. As shown in the following FIG. 3, both are in a proportional relationship to the molecular weight M.

Namely, from FIG. 3, when Y1 and Y2 are regarded as functions of the molecular weight M, the following equations can be derived.

$$Y1=1.0\times10^{-6}M+0.015T+0.19$$

$$Y2=-1.4\times10^{-6}M+0.015T+0.44$$

On the other hand, when extraction purification is preformed using a polyethylene glycol compound having a certain molecular weight, the molecular weight M can be regarded as a constant, so that, when the temperature T is a variable and respective intercepts are taken as C and B for Y1 and Y2, the following equations are obtained: Y1=0.015T+C and Y2=0.015T+B. These relationships are shown as in FIG. 4.

As shown in FIG. 4, the purification by extraction is possible when the mixing ratio Y falls within the gray area in FIG. 4, that is, falls within the region that satisfies Y≤0.015T+B and Y≥0.015T+C.

In summary, when the mixed ratio of the organic solvent I to the organic solvent II (organic solvent I/organic solvent II) is taken as Y, the temperature in the step (B) is taken as T (° C.), and the molecular weight of the polyethylene glycol compound is taken as M, the following:

$$1.0\times10^{-6}M+0.19\leq Y-0.015T\leq-1.4\times10^{-6}M+0.44$$

shows a range for the preferable condition.

On the other hand, when the intercepts C and B coincide with each other, the region where purification by extraction in the preferable mode is possible in FIG. 4 is not present. The molecular weight M at this time is M=104167 due to the fact of A=B. That is, the upper limit of the molecular weight, at which the purification in the preferable mode is possible, comes to 104167.

From the above, when the mixed ratio of the organic solvent I to the organic solvent II (organic solvent I/organic solvent II) is taken as Y, the temperature in the step (B) is taken as T (° C.), and the molecular weight of the polyethylene glycol compound is taken as M, the following:

$$1.9\times10^{-6}M+0.09\leq Y-0.015T\leq-1.4\times10^{-6}M+0.44$$

is a range where the purification in the preferable mode is possible, and the following:

$$1.0\times10^{-6}M+0.19\leq Y-0.015T\leq-1.4\times10^{-6}M+0.44$$

is preferred.

Example 1

In the present example, the molecular weight M is 5000, the extraction temperature is 25° C., and Y is 0.67.

α-Methoxy-ω-aminoethyl-polyethylene glycol represented by the formula [1] (molecular weight: 5000, amine purity: 90.5%): 1250 g and water: 6250 g were placed in a 20 L four-necked separable flask fitted with a mechanical stirring apparatus, a Dimroth condenser, a thermometer, and a nitrogen inlet tube and were dissolved with stirring under nitrogen at room temperature. pH was adjusted to 2 by adding 85% phosphoric acid thereto. A mixed solvent of toluene: 2500 g and chloroform: 3750 g was added thereto, the whole was stirred at 25° C. for 30 minutes, and, after stirring was stopped, the whole was allowed to stand at the same temperature for 30 minutes to cause layer separation. The layer-separated underlying organic layer was removed and a newly prepared mixed solvent of toluene: 2500 g and chloroform: 3750 g was added thereto, followed by performing an extraction operation similarly. After stirring and layer separation, the organic layer was removed and sodium chloride: 2000 g was added to the remaining aqueous layer, followed by stirring and dissolution at room temperature. pH was adjusted to 11 by adding 400 g/L NaOH aq: 59.5 g to the solution. The whole was slowly stirred and heated to 50° C., toluene: 6250 g was added and stirring was performed at 50° C. for 30 minutes, and, after stirring was stopped, the whole was allowed to stand at the same temperature for 30 minutes to cause layer separation. The underlying organic layer was recovered into an eggplant-shaped flask. Toluene: 3125 g was added to perform extraction again and the organic layer was recovered into the eggplant-shaped flask. The organic layer was concentrated on an evaporator at 50° C. and, after dilution by adding ethyl acetate: 1250 g, dehydration was conducted with magnesium sulfate: 375 g, followed by filtration. The filtration cake was washed with ethyl acetate: 1250 g and the washing liquid was combined with the filtrate. After the solution was cooled to room temperature with stirring using a magnetic stirrer, hexane: 3750 g was added thereto to precipitate crystals. The slurry was stirred for 30 minutes and filtrated and, after the residue was washed with 3750 g of hexane, drying was performed in vacuo to obtain a purified product (1076 g, amine purity: 99.0%, amine yield: 94.2%).

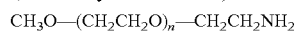  [1]

Example 1-1

In Example 1, Y was variously changed at an extraction temperature of 25° C. and the mixing ratio (Y1) at which the mass of the polyethylene glycol compound having one amino group in the mass of the concentrate was 5% and the mixing ratio (Y3) at which the mass of the compound was 20% were investigated. As a result, Y1 was 0.57 and Y3 was 0.47.

Example 1-2

In Example 1, Y was variously changed at an extraction temperature of 25° C. and the mixing ratio (Y2) at which the resulting concentrate was minimum was investigated. As a result, Y2 was 0.81.

Example 1-3

The extraction temperature was set at 15, 35, and 55° C. under the same conditions as in Example 1 and Y1, Y2, and Y3 were investigated as in Example 1-1 and Example 1-2. FIG. 1 is a figure in which the results are plotted.

Example 2

In the present example, the molecular weight M is 10000, the extraction temperature T is 25° C., and Y is 0.67.

α-Methoxy-ω-aminopropyl-polyethylene glycol represented by the formula [2] (molecular weight: 10000, amine purity: 88.1%): 20 g and water: 100 g were placed in a 300 mL four-necked flask fitted with a mechanical stirring apparatus, a Dimroth condenser, a thermometer, and a nitrogen inlet tube and were dissolved with stirring under nitrogen at room temperature. pH was adjusted to 2 by adding 85% phosphoric acid thereto. A mixed solvent of toluene: 40 g and chloroform: 60 g was added thereto, the whole was stirred at 25° C. for 30 minutes, and, after stirring was stopped, the whole was allowed to stand at the same temperature for 30 minutes to cause layer separation. The layer-separated underlying organic layer was removed and a newly prepared mixed solvent of toluene: 40 g and chloroform: 60 g was added thereto, followed by performing an extraction operation similarly. After stirring and layer separation, the organic layer was removed and sodium chloride: 26 g was added to the remaining aqueous layer, followed by stirring and dissolution at room temperature. pH was adjusted to 12 by adding 400 g/L NaOH aq to the solution. The whole was slowly stirred and heated to 50° C., toluene: 100 g was added and stirring was performed at 50° C. for 30 minutes. After stirring was stopped, the whole was allowed to stand at the same temperature for 30 minutes to cause layer separation. The underlying organic layer was recovered into an eggplant-shaped flask. Toluene: 100 g was added to perform extraction again and the organic layer was recovered into the eggplant-shaped flask. The organic layer was concentrated on an evaporator at 50° C. and, after dilution by adding ethyl acetate: 100 g, dehydration was conducted with magnesium sulfate: 10 g, followed by filtration. The filtration cake was washed with ethyl acetate: 50 g and the washing liquid was combined with the filtrate. After the solution was cooled to room temperature with stirring using a magnetic stirrer, hexane: 140 g was added thereto to precipitate crystals. The slurry was stirred for 30 minutes and filtrated and, after the residue was washed with 140 g of hexane, drying was performed in vacuo to obtain a purified product (16 g, amine purity: 98.6%, amine yield: 89.5%).

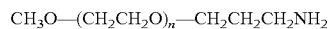  [2]

Example 2-1

In Example 2, Y was variously changed and the mixing ratio (Y1) at which the mass of the polyethylene glycol compound having one amino group in the mass of the concentrate was 5% and the mixing ratio (Y3) at which the mass of the compound was 20% were investigated. As a result, Y1 was 0.58 and Y3 was 0.48.

Example 2-2

In Example 2, Y was variously changed and the mixing ratio (Y2) at which the resulting concentrate was minimum was investigated. As a result, Y2 was 0.80.

Example 3

In the present example, the molecular weight M is 20000, the extraction temperature T is 20° C., and Y is 0.57.

α-Methoxy-ω-aminopropyl-polyethylene glycol represented by the formula [3] (molecular weight: 20000, amine purity: 89.1%): 9 g and water: 60 g were placed in a 300 mL four-necked flask fitted with a mechanical stirring apparatus, a Dimroth condenser, a thermometer, and a nitrogen inlet tube and were dissolved with stirring under nitrogen at room temperature. pH was adjusted to 1 by adding 85% phosphoric acid thereto. A mixed solvent of toluene: 20 g and chloroform: 35 g was added thereto, the whole was stirred at 20° C. for 30 minutes, and, after stirring was stopped, the whole was allowed to stand at the same temperature for 30 minutes to cause layer separation. The layer-separated underlying organic layer was removed and sodium chloride: 26 g was added to the remaining aqueous layer, followed by stirring and dissolution at room temperature. pH was adjusted to 12 by adding 50% by mass KOH aq to the solution. The whole was slowly stirred and heated to 50° C., toluene: 50 g was added, and stirring was performed at 50° C. for 30 minutes. After stirring was stopped, the whole was allowed to stand at the same temperature for 30 minutes to cause layer separation. The underlying organic layer was recovered into an eggplant-shaped flask. Toluene: 50 g was added to perform extraction again and the organic layer was recovered into the eggplant-shaped flask. The organic layer was concentrated on an evaporator at 50° C. and, after dilution by adding toluene: 50 g, dehydration was conducted with magnesium sulfate: 5 g, followed by filtration. After the solution was cooled to room temperature with stirring using a magnetic stirrer, hexane: 50 g was added thereto to precipitate crystals. The slurry was stirred for 30 minutes and filtrated and, after the residue was washed with 50 g of hexane, drying was performed in vacuo to obtain a purified product (7.4 g, amine purity: 98.0%, amine yield: 90.4%).

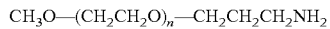
$$CH_3O-(CH_2CH_2O)_n-CH_2CH_2CH_2NH_2 \quad [3]$$

Example 3-1

In Example 3, Y was variously changed and the mixing ratio (Y1) at which the mass of the polyethylene glycol compound having one amino group in the mass of the concentrate was 5% and the mixing ratio (Y3) at which the mass of the compound was 20% were investigated. As a result, Y1 was 0.51 and Y3 was 0.43.

Example 3-2

In Example 3, Y was variously changed and the mixing ratio (Y2) at which the resulting concentrate was minimum was investigated. As a result, Y2 was 0.71.

Example 4

In the present example, the molecular weight M is 20000, the extraction temperature T is 15° C., and Y is 0.5.

A branched polyethylene glycol derivative represented by the formula [4] (molecular weight: 20000, amine purity: 74.9%): 4 g and water: 50 g were placed in a 300 mL four-necked flask fitted with a mechanical stirring apparatus, a Dimroth condenser, a thermometer, and a nitrogen inlet tube and were dissolved with stirring under nitrogen at room temperature. pH was adjusted to 2 by adding 6N HCl aq thereto. A mixed solvent of toluene: 20 g and chloroform: 40 g was added thereto, the whole was stirred at 15° C. for 30 minutes, and, after stirring was stopped, the whole was allowed to stand at the same temperature for 30 minutes to cause layer separation. The layer-separated underlying organic layer was removed and a newly prepared mixed solvent of toluene: 10 g and chloroform: 20 g was added thereto, followed by performing an extraction operation similarly. After stirring and layer separation, the organic layer was removed and sodium chloride: 12 g was added to the remaining aqueous layer, followed by stirring and dissolution at room temperature. pH was adjusted to 12 by adding 400 g/L NaOH aq to the solution. The whole was slowly stirred and heated to 50° C., toluene: 30 g was added, and stirring was performed at 50° C. for 30 minutes. After stirring was stopped, the whole was allowed to stand at the same temperature for 30 minutes to cause layer separation. The underlying organic layer was recovered into an eggplant-shaped flask. The organic layer was concentrated on an evaporator at 50° C. and, after dilution by adding toluene: 50 g, dehydration was conducted with magnesium sulfate: 2 g, followed by filtration. After the solution was cooled to room temperature with stirring using a magnetic stirrer, hexane: 50 g was added thereto to precipitate crystals. The slurry was stirred for 30 minutes and filtrated and, after the residue was washed with 50 g of hexane, drying was performed in vacuo to obtain a purified product (3.0 g, amine purity: 96.0%, amine yield: 96.1%).

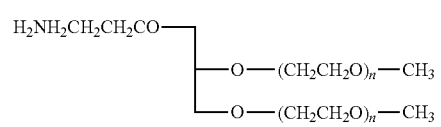

[4]

Example 4-1

In Example 4, Y was variously changed and the mixing ratio (Y1) at which the mass of the polyethylene glycol compound having one amino group in the mass of the concentrate was 5% and the mixing ratio (Y3) at which the mass of the compound was 20% were investigated. As a result, Y1 was 0.44 and Y3 was 0.35.

Example 4-2

In Example 4, Y was variously changed and the mixing ratio (Y2) at which the resulting concentrate was minimum was investigated. As a result, Y2 was 0.64.

Example 5

In the present example, the molecular weight M is 60000, the extraction temperature T is 27.5° C., and Y is 0.67.

A branched polyethylene glycol derivative represented by the formula [5] (molecular weight: 60000, amine purity: 81.5%): 1190 g and water: 12 kg were placed in a 50 L four-necked separable flask fitted with a mechanical stirring apparatus, a Dimroth condenser, a thermometer, and a nitrogen inlet tube and were dissolved with stirring under nitrogen at room temperature. pH was adjusted to 2 by adding 85% phosphoric acid thereto. A mixed solvent of toluene: 4.8 kg and chloroform: 7.2 kg was added thereto, the whole was stirred at 27.5° C. for 30 minutes, and, after stirring was stopped, the whole was allowed to stand at the same temperature for 30 minutes to cause layer separation. The layer-separated underlying organic layer was removed and a newly prepared mixed solvent of toluene: 4.8 kg and chloroform: 7.2 kg was added thereto, followed by performing an extraction operation similarly. After stirring and layer separation, the organic layer was removed and sodium chloride: 3.08 kg was added to the remaining aqueous layer, followed by stirring and dissolution at room temperature. pH was adjusted to 12 by adding 400 g/L NaOH aq: 51.0 g to the solution. The whole was slowly stirred and heated to 50° C., toluene: 12.2 kg was added, and stirring was performed at 50° C. for 30 minutes. After stirring was stopped, the whole was allowed to stand at the same temperature for 30 minutes to cause layer separation. The underlying organic layer was recovered into an eggplant-shaped flask. Toluene: 6.76 kg was added to perform extraction again and the organic layer was recovered into the eggplant-shaped flask. The organic layer was concentrated on an evaporator at 50° C. and dehydration was conducted with magnesium sulfate: 605 g, followed by filtration. The filtration cake was washed with toluene: 3.61 kg and the washing liquid was combined with the filtrate. After the solution was cooled to room temperature with stirring using a magnetic stirrer, hexane: 9.61 kg was added thereto to precipitate crystals. The slurry was stirred for 30 minutes and filtrated and, after the residue was washed with 1.21 kg of hexane, drying was performed in vacuo to obtain a purified product (877 g, amine purity: 97.4%, amine yield: 88.0%).

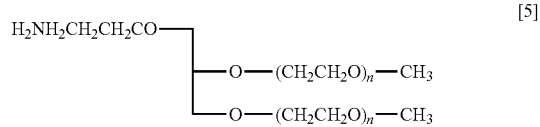

[5]

Example 5-1

In Example 5, Y was variously changed at an extraction temperature of 27.5° C. and the mixing ratio (Y1) at which the mass of the polyethylene glycol compound having one amino group in the mass of the concentrate was 5% and the mixing ratio (Y3) at which the mass of the compound was 20% were investigated. As a result, Y1 was 0.66 and Y3 was 0.62.

Example 5-2

In Example 5, Y was variously changed at an extraction temperature of 27.5° C. and the mixing ratio (Y2) at which the resulting concentrate was minimum was investigated. As a result, Y2 was 0.77.

Example 5-3

The extraction temperature was set at 15, 35, and 55° C. under the same conditions as in Example 5 and Y1, Y2, and Y3 were investigated as in Example 5-1 and Example 5-2. FIG. 2 is a figure in which the results are plotted.

Example 6

In the present example, the molecular weight M is 40000, the extraction temperature T is 25° C., and Y is 0.67.

A branched polyethylene glycol derivative represented by the formula [6] (molecular weight: 40000, amine purity: 73%): 1 g and water: 10 g were placed in a 300 mL four-necked flask fitted with a mechanical stirring apparatus, a Dimroth condenser, a thermometer, and a nitrogen inlet tube and were dissolved with stirring under nitrogen at room temperature. pH was adjusted to 2 by adding trifluoroacetic acid thereto. A mixed solvent of toluene: 10 g and chloroform: 15 g was added thereto, the whole was stirred at 25° C. for 30 minutes, and, after stirring was stopped, the whole was allowed to stand at the same temperature for 30 minutes to cause layer separation. The layer-separated underlying organic layer was removed and a newly prepared mixed solvent of toluene: 10 g and chloroform: 15 g was added thereto, followed by performing an extraction operation similarly. After stirring and layer separation, the organic layer was removed and water: 10 g and sodium chloride: 5 g were added to the remaining aqueous layer, followed by stirring and dissolution at room temperature. pH was adjusted to 12 by adding 400 g/L NaOH aq to the solution. Chloroform: 50 g was added and stirring was performed at room temperature for 30 minutes. After stirring was stopped, the whole was allowed to stand at the same temperature for 30 minutes to cause layer separation. The underlying organic layer was recovered into an eggplant-shaped flask. Chloroform: 50 g was added to perform extraction again and the organic layer was recovered into the eggplant-shaped flask. The organic layer was concentrated on an evaporator at 40° C. and, after dilution by adding ethyl acetate: 50 g, dehydration was conducted with magnesium sulfate: 1 g, followed by filtration. After the solution was cooled to room temperature with stirring using a magnetic stirrer, hexane: 50 g was added thereto to precipitate crystals. The slurry was stirred for 30 minutes and filtrated and, after the residue was washed with 10 g of hexane, drying was performed in vacuo to obtain a purified product (0.7 g, amine purity: 95.0%, amine yield: 91.1%).

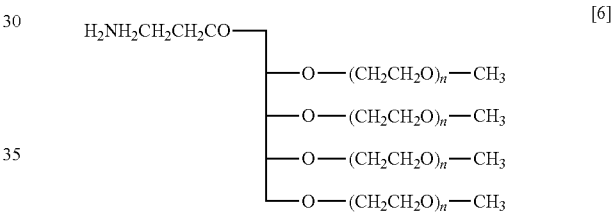

[6]

Example 6-1

In Example 6, Y was variously changed and the mixing ratio (Y1) at which the mass of the polyethylene glycol compound having one amino group in the mass of the concentrate was 5% and the mixing ratio (Y3) at which the mass of the compound was 20% were investigated. As a result, Y1 was 0.61 and Y3 was 0.54.

Example 6-2

In Example 6, Y was variously changed and the mixing ratio (Y2) at which the resulting concentrate was minimum was investigated. As a result, Y2 was 0.76.

Example 7

In the present example, the molecular weight M is 20000, the extraction temperature T is 20° C., and Y is 0.57.

A polyethylene glycol derivative represented by the formula [7] (molecular weight: 20000, amine purity: 77.7%): 4 g and water: 50 g were placed in a 300 mL four-necked flask fitted with a mechanical stirring apparatus, a Dimroth condenser, a thermometer, and a nitrogen inlet tube and were dissolved with stirring under nitrogen at room temperature. pH was adjusted to 1 by adding 85% phosphoric acid thereto. A mixed solvent of toluene: 10 g and chloroform: 17.5 g was added thereto, the whole was stirred at 20° C. for 30 minutes, and, after stirring was stopped, the whole was allowed to stand at the same temperature for 30 minutes to cause layer separation. The layer-separated underlying organic layer was removed and a newly prepared mixed solvent of toluene: 10 g and chloroform: 20 g was added thereto, followed by performing an extraction operation similarly. After stirring and layer separation, the organic layer was removed and sodium chloride: 12 g was added to the remaining aqueous layer, followed by stirring and dissolution at room temperature. pH was adjusted to 14 by adding 400 g/L NaOH aq to the solution. The whole was slowly stirred and heated to 50° C., toluene: 50 g was added, and stirring was performed at 50° C. for 30 minutes. After stirring was stopped, the whole was allowed to stand at the same temperature for 30 minutes to cause layer separation. The underlying organic layer was recovered into an eggplant-shaped flask. Toluene: 50 g was added to perform extraction again and the organic layer was recovered into the eggplant-shaped flask. The organic layer was concentrated on an evaporator at 50° C. and, after dilution by adding toluene: 50 g, dehydration was conducted with magnesium sulfate: 1 g, followed by filtration. After the solution was cooled to room temperature with stirring using a magnetic stirrer, hexane: 40 g was added thereto to precipitate crystals. The slurry was stirred for 30 minutes and filtrated and, after the residue was washed with 50 g of hexane, drying was performed in vacuo to obtain a purified product (2.8 g, amine purity: 95.9%, amine yield: 86.4%).

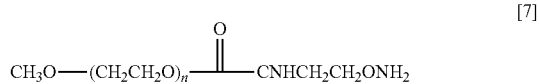

[7]

Example 7-1

In Example 7, Y was variously changed and the mixing ratio (Y1) at which the mass of the polyethylene glycol compound having one amino group in the mass of the concentrate was 5% and the mixing ratio (Y3) at which the mass of the compound was 20% were investigated. As a result, Y1 was 0.51 and Y3 was 0.43.

Example 7-2

In Example 7, Y was variously changed and the mixing ratio (Y2) at which the resulting concentrate was minimum was investigated. As a result, Y2 was 0.71.

Example 8

In the present example, the molecular weight M is 2000, the extraction temperature T is 25° C., and Y is 0.67.

α-Hydroxy-ω-aminopropyl-polyethylene glycol represented by the formula [8] (molecular weight: 2000, amine purity: 89.0%): 92 g and water: 50 g were placed in a 2 L four-necked flask fitted with a mechanical stirring apparatus, a Dimroth condenser, a thermometer, and a nitrogen inlet tube and were dissolved with stirring under nitrogen at room temperature. pH was adjusted to 2 by adding trifluoroacetic acid thereto. A mixed solvent of toluene: 200 g and chloroform: 300 g was added thereto, the whole was stirred at 25° C. for 30 minutes, and, after stirring was stopped, the whole was allowed to stand at the same temperature for 30 minutes to cause layer separation. The layer-separated underlying organic layer was removed and a newly prepared mixed solvent of toluene: 200 g and chloroform: 300 g was added thereto, followed by performing an extraction operation similarly. After stirring and layer separation, the organic layer was removed and sodium chloride: 165 g was added to the remaining aqueous layer, followed by stirring and dissolution at room temperature. pH was adjusted to 11 by adding 400 g/L NaOH aq to the solution. The whole was slowly stirred and heated to 50° C., toluene: 500 g was added, and stirring was performed at 50° C. for 30 minutes. After stirring was stopped, the whole was allowed to stand at the same temperature for 30 minutes to cause layer separation. The upper organic layer was recovered into an eggplant-shaped flask. Toluene: 250 g was added to perform extraction again and the organic layer was recovered into the eggplant-shaped flask. The organic layer was concentrated on an evaporator at 50° C. and, after dilution by adding toluene: 150 g, dehydration was conducted with magnesium sulfate: 30 g, followed by filtration. After the solution was cooled to room temperature with stirring using a magnetic stirrer, hexane: 300 g was added thereto to precipitate crystals. The slurry was stirred for 30 minutes and filtrated and, after the residue was washed with 300 g of hexane, drying was performed in vacuo to obtain a purified product (80 g, amine purity: 98.5%, amine yield: 96.2%).

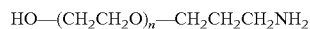

[8]

Example 8-1

In Example 8, Y was variously changed and the mixing ratio (Y1) at which the mass of the polyethylene glycol compound having one amino group in the mass of the concentrate was 5% and the mixing ratio (Y3) at which the mass of the compound was 20% were investigated. As a result, Y1 was 0.57 and Y3 was 0.47.

Example 8-2

In Example 8, Y was variously changed and the mixing ratio (Y2) at which the resulting concentrate was minimum was investigated. As a result, Y2 was 0.81.

Comparative Example 1

Next, purification was carried out with an ion-exchange column in the same manner as in Examples of Patent Document 1 (JP-A-1-165343). In the Examples, α-methoxy-ω-aminopropyl-polyethylene glycol having a molecular weight of 12000 was used as a raw material but, in order to clarify the effects of the invention, purification was performed using α-methoxy-ω-aminoethyl-polyethylene glycol having a molecular weight of 5000 and the results were compared with each other.

α-Methoxy-ω-aminoethyl-polyethylene glycol represented by the formula [1] (molecular weight: 5000, amine purity: 90.5%): 15 g was dissolved in 135 g of ion-exchange water and the solution was allowed to flow at a flow rate of 1 mL per minute through a column packed with 150 g of a regenerated base-exchanging type ion-exchange resin DIAION PK216 [a product of Mitsubishi Chemical Corporation, trade name] using ion-exchange water as a mobile layer. At the time point when the liquid level of the column reached the same level as the boundary surface of the packed resin, 1.5 L of ion-exchange water was allowed to flow at a flow rate of 4 mL per minute. Then, 0.8 L of 5% ammonia water was allowed to flow at a flow rate of 1 mL per minute and 800 mL of an effluent was collected. Subsequently, sodium chloride: 24 g was added to the collected effluent and the whole was stirred and dissolved at room temperature. The whole was slowly stirred and heated to 50° C., toluene: 80 g was added and stirring was performed at 50° C. for 30 minutes, and, after stirring was stopped, the whole was allowed to stand at the same temperature for 30 minutes to cause layer separation. The upper organic layer was recovered into an eggplant-shaped flask. Toluene: 40 g was added to perform extraction again and the organic layer was recovered into the eggplant-shaped flask. The organic layer was concentrated on an evaporator at 50° C. and, after dilution by adding ethyl acetate: 30 g, dehydration was conducted with magnesium sulfate: 5 g, followed by filtration. The filtration cake was washed with ethyl acetate: 30 g and the washing liquid was combined with the filtrate. After the solution was cooled to room temperature with stirring using a magnetic stirrer, hexane: 60 g was added thereto to precipitate crystals. The slurry was stirred for 30 minutes and filtrated and, after the residue was washed with 40 g of hexane, drying was performed in vacuo to obtain a purified product (10.2 g, amine purity: 98.9%, amine yield: 74.3%).

Comparative Example 2

Under the same conditions as in Example 1, a comparative investigation whether purification with a single solvent is possible or not was carried out using not the mixed solvent but chloroform as an extraction solvent.

α-Methoxy-ω-aminoethyl-polyethylene glycol represented by the formula [1] (molecular weight: 5000, amine purity: 90.5%): 10 g and water: 50 g were placed in a 300 mL four-necked flask fitted with a mechanical stirring apparatus, a Dimroth condenser, a thermometer, and a nitrogen inlet tube and were dissolved with stirring under nitrogen at room temperature. pH was adjusted to 2 by adding 6N HCl aq: 0.5 g thereto. Chloroform: 30 g was added thereto, the whole was stirred at 25° C. for 30 minutes, and, after stirring was stopped, the whole was allowed to stand at the same temperature for 30 minutes to cause layer separation. The layer-separated underlying organic layer was removed and chloroform: 30 g was newly added thereto, followed by performing an extraction operation similarly. After stirring and layer separation, the organic layer was removed and sodium chloride: 16 g was added to the remaining aqueous layer, followed by stirring and dissolution at room temperature. pH was adjusted to 11 by adding 400 g/L NaOH aq: 0.48 g to the solution. The whole was slowly stirred and heated to 50° C., toluene: 50 g was added and stirring was performed at 50° C. for 30 minutes, and, after stirring was stopped, the whole was allowed to stand at the same temperature for 30 minutes to cause layer separation. The upper organic layer was recovered into an eggplant-shaped flask. Toluene: 25 g was added to perform extraction again and the organic layer was recovered into the eggplant-shaped flask. When the organic layer was concentrated on an evaporator at 50° C., a concentrate was obtained in only a trace amount and a purified product could not be obtained.

Comparative Example 3

Under the same conditions as in Example 1, a comparative investigation whether purification with a single solvent is possible or not was carried out using not the mixed solvent but toluene as an extraction solvent.

α-Methoxy-ω-aminoethyl-polyethylene glycol represented by the formula [1] (molecular weight: 5,000, amine purity: 90.5%): 10 g and water: 50 g were placed in a 300 mL four-necked flask fitted with a mechanical stirring apparatus, a Dimroth condenser, a thermometer, and a nitrogen inlet tube and were dissolved with stirring under nitrogen at room temperature. pH was adjusted to 2 by adding 6N HCl aq: 0.5 g thereto. Toluene: 30 g was added thereto, the whole was stirred at 25° C. for 30 minutes, and, after stirring was stopped, the whole was allowed to stand at the same temperature for 30 minutes to cause layer separation. The layer-separated upper organic layer was removed and newly prepared toluene: 30 g was added thereto, followed by performing an extraction operation similarly. After stirring and layer separation, the organic layer was removed and sodium chloride: 16 g was added to the remaining aqueous layer, followed by stirring and dissolution at room temperature. pH was adjusted to 11 by adding 400 g/L NaOH aq: 0.5 g to the solution. The whole was slowly stirred and heated to 50° C., toluene: 50 g was added and stirring was performed at 50° C. for 30 minutes, and, after stirring was stopped, the whole was allowed to stand at the same temperature for 30 minutes to cause layer separation. The upper organic layer was recovered into an eggplant-shaped flask. Toluene: 25 g was added to perform extraction again and the organic layer was recovered into the eggplant-shaped flask. The organic layer was concentrated on an evaporator at 50° C. and, after dilution by adding ethyl acetate: 10 g, dehydration was conducted with magnesium sulfate: 3 g, followed by filtration. The filtration cake was washed with ethyl acetate: 10 g and the washing liquid was combined with the filtrate. After the solution was cooled to room temperature with stirring using a magnetic stirrer, hexane: 30 g was added thereto to precipitate crystals. The slurry was stirred for 30 minutes and filtrated and, after the residue was washed with 30 g of hexane, drying was performed in vacuo to obtain crystals. When the mass was measured, it was hardly changed from the charged mass and the amine purity was 90.5% that is the same as before purification, so that a purified product could not be obtained.

The results of Example 1 and Comparative Examples 1, 2, and 3 are shown in the following Table 1.

TABLE 1

| | Example 1 | Comparative Example 1 | Comparative Example 2 | Comparative Example 3 |
|---|---|---|---|---|
| Amine purity before purification (%)*[1] | 90.5 | 90.5 | 90.5 | 90.5 |
| Amine purity after purification (%)*[1] | 99.0 | 98.9 | — | 90.5 |
| Amine yield (%) | 94.2 | 74.3 | — | — |

*[1]measured by HPLC

As shown in Table 1, the amine purity of the polyethylene glycol compound having one amino group obtained by the purification method of the invention is equal to that of the purified product by the ion-exchange column in Comparative Example 1 and, with regard to the amine yield, a remarkably high result was obtained.

Figure 5:
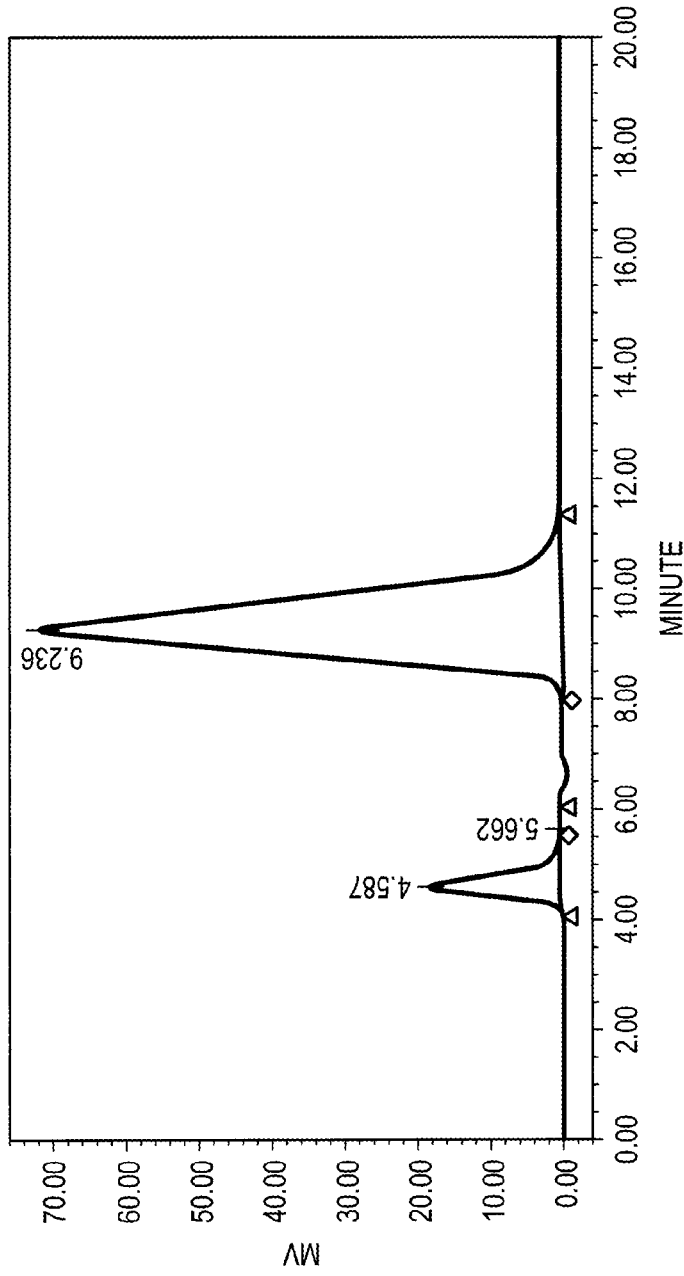
FIG. 5 shows an HPLC chromatogram of the raw material used in extraction purification in Example 1.
Figure 6:
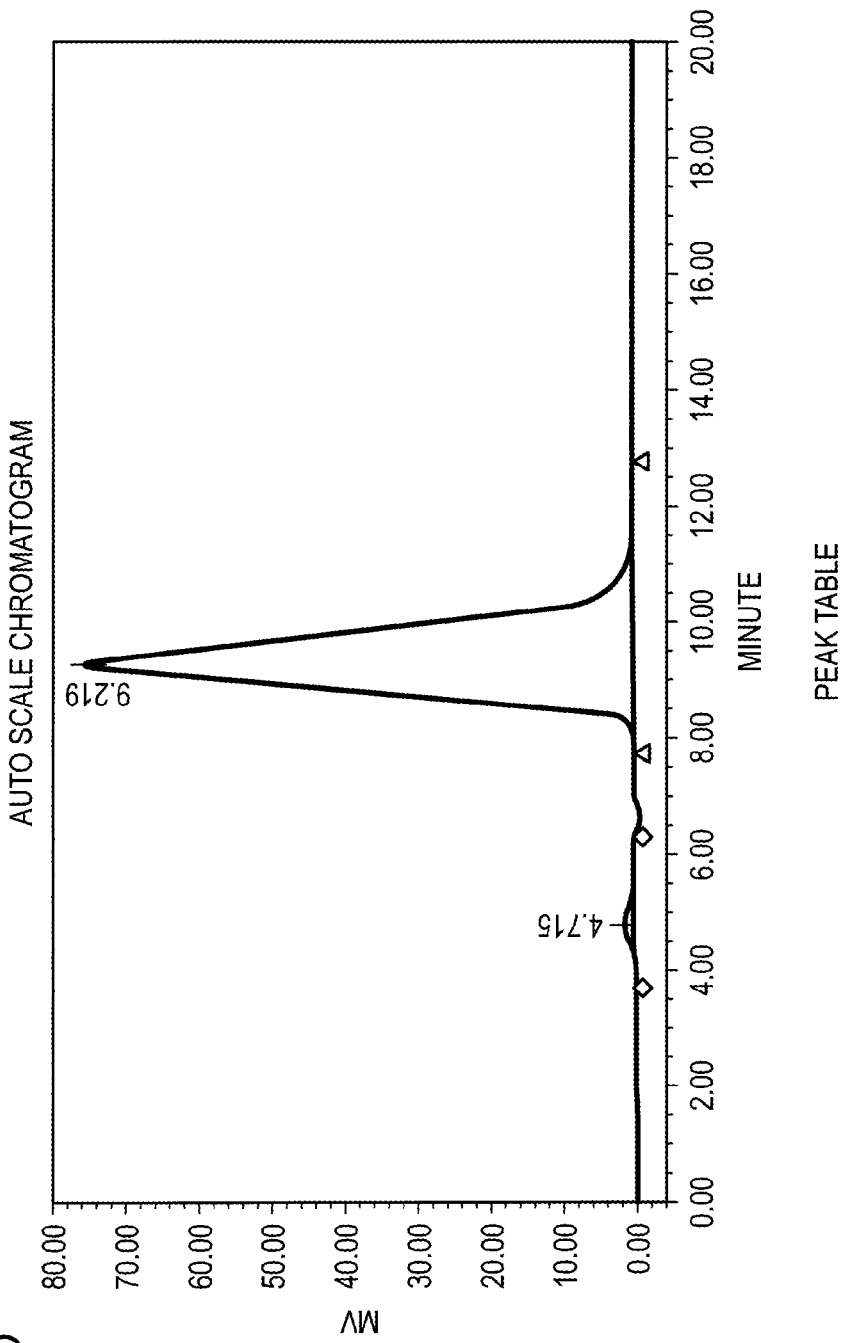
FIG. 6 shows an HPLC chromatogram of the purified product obtained in Example 1.

Incidentally, FIG. 5 shows an HPLC chromatogram of the raw material used for extraction purification in Example 1 and FIG. 6 shows an HPLC chromatogram of the purified product obtained in Example 1.

On the other hand, in Comparative Examples 2 and 3, comparative investigation was conducted with a single solvent using no mixed solvent. In Comparative Example 2 in which chloroform was used as an extraction solvent, almost the whole polyethylene glycol compound was extracted into the organic layer and purification could not be performed. Moreover, in Comparative Example 3 in which toluene was used, no polyethylene glycol compound was extracted into the organic layer and thus purification could not be performed.

From the above, the present invention is a useful purification method capable of industrially producing a polyethylene glycol compound having one amino group with high purity and good yield.

While the invention has been described in detail and with reference to specific embodiments thereof, it will be apparent to one skilled in the art that various changes and modifications can be made therein without departing from the spirit and scope thereof.

The present application is based on Japanese Patent Application No. 2013-66687 filed on Mar. 27, 2013, and the contents are incorporated herein by reference. Also, all the references cited herein are incorporated as a whole.

The invention claimed is:

1. A method for purifying a polyethylene glycol compound having one amino group and having a total average molar number of ethylene oxide units added in a molecule thereof of 20 to 2300,
the method comprising the following steps (A), (B) and (C):
(A) a step of preparing an aqueous solution of the polyethylene glycol compound having one amino group, the solution having a pH of 1 to 5,
(B) an extraction step of mixing the aqueous solution obtained in the step (A) with a mixed organic solvent at a temperature of 10° C. or higher and 55° C. or lower and causing layer separation into an organic layer and an aqueous layer, wherein a ratio of an organic solvent I is 25 to 65% by mass and a ratio of an organic solvent II is 75 to 35% by mass in the mixed organic solvent, the organic solvent I is selected from an aromatic hydrocarbon-based solvent having a total carbon number of 8 or less and an ester compound solvent containing no hetero atom and having a total carbon number of 5 or less, the organic solvent II is a halogenated hydrocarbon-based solvent, and a mixing ratio Y of the organic solvent I to the organic solvent II (organic solvent I/organic solvent II), temperature T (° C.) at the mixing, and molecular weight M of the polyethylene glycol compound satisfy the following relationship:

$1.9 \times 10^{-6} M + 0.09 \leq Y - 0.015T \leq -1.4 \times 10^{-6} M + 0.44$, and
(C) a step of recovering the polyethylene glycol compound from the aqueous layer.

2. The method according to claim 1, wherein, in the step (B), the mixing ratio Y of the organic solvent I to the organic solvent II (organic solvent I/organic solvent II), the temperature T (° C.) at the mixing, and the molecular weight M of the polyethylene glycol compound satisfy the following relationship:

$1.0 \times 10^{-6} M + 0.19 \leq Y - 0.015T \leq -1.4 \times 10^{-6} M + 0.44$.

3. The method according to claim 1, wherein the extraction step (B) is repeated one or more times for the aqueous layer separated in the step (B).

4. The method according to claim 1, wherein the aqueous solution contains an acidic reagent selected from the group consisting of hydrochloric acid, phosphoric acid, and trifluoroacetic acid, in the step (A).

5. The method according to claim 1, wherein the organic solvent I is selected from the group consisting of toluene and ethyl acetate.

6. The method according to claim 1, wherein the organic solvent II is chloroform.

7. The method according to claim 1, wherein a mass of the organic solvent I and a mass of the organic solvent II in the step (B) are each 1 to 50 times a mass of the polyethylene glycol compound and a mass of the water contained in the aqueous solution in the step (A) is 1 to 50 times the mass of the polyethylene glycol compound.

8. The method according to claim 1, wherein after the aqueous layer is made neutral or alkaline, the polyethylene glycol is recovered by concentration, crystallization or drying via extraction into an organic layer, in the step (C).

9. The method according to claim 1, wherein the total average molar number of ethylene oxide units added in the polyethylene glycol compound molecule is 40 to 2050.

10. The method according to claim 2, wherein the extraction step (B) is repeated one or more times for the aqueous layer separated in the step (B).

11. The method according to claim 2, wherein the aqueous solution contains an acidic reagent selected from the group consisting of hydrochloric acid, phosphoric acid, and trifluoroacetic acid, in the step (A).

12. The method according to claim 2, wherein the organic solvent I is selected from the group consisting of toluene and ethyl acetate.

13. The method according to claim 2, wherein the organic solvent II is chloroform.

14. The method according to claim 2, wherein a mass of the organic solvent I and a mass of the organic solvent II in the step (B) are each 1 to 50 times a mass of the polyethylene glycol compound and a mass of the water contained in the aqueous solution in the step (A) is 1 to 50 times the mass of the polyethylene glycol compound.

15. The method according to claim 2, wherein after the aqueous layer is made neutral or alkaline, the polyethylene glycol is recovered by concentration, crystallization or drying via extraction into an organic layer, in the step (C).

16. The method according to claim 2, wherein the total average molar number of ethylene oxide units added in the polyethylene glycol compound molecule is 40 to 2050.

* * * * *